United States Patent [19]

Leigh-Monstevens

[11] Patent Number: 4,742,902
[45] Date of Patent: May 10, 1988

[54] CLUTCH RELEASE BEARING AND BEARING CARRIER ASSEMBLY

[75] Inventor: Keith V. Leigh-Monstevens, Troy, Mich.

[73] Assignee: Automotive Products plc, Warwickshire, England

[21] Appl. No.: 585,123

[22] Filed: Mar. 1, 1984

[51] Int. Cl.$^4$ .............................................. F16D 23/14
[52] U.S. Cl. ................................... 192/98; 192/99 S; 192/110 B; 384/536; 403/348
[58] Field of Search ................... 192/98, 99 S, 110 B; 403/348, 349; 384/536, 539, 611, 617

[56] References Cited

U.S. PATENT DOCUMENTS

| | | | |
|---|---|---|---|
| 3,564,984 | 2/1971 | Alexander | 403/348 X |
| 4,046,436 | 9/1977 | Brown | 384/617 |
| 4,186,828 | 2/1980 | Renand | 192/98 |
| 4,229,058 | 10/1980 | Arrowsmith et al. | 192/110 B |
| 4,313,644 | 2/1982 | Dagiel | 192/110 B X |
| 4,498,566 | 2/1985 | Renand | 192/99 S X |

FOREIGN PATENT DOCUMENTS 2701999 7/1977 Fed. Rep. of Germany ........ 192/98
2745929 4/1979 Fed. Rep. of Germany .

Primary Examiner—Martin P. Schwadron
Assistant Examiner—Stephen M. Hepperle
Attorney, Agent, or Firm—Krass & Young

[57] ABSTRACT

A clutch release bearing and bearing carrier assembly comprising a bearing support flange at one end of a carrier member, the bearing support flange having elastically outwardly spreadable fingers or lugs with a retaining ledge or shoulder at their end for holding a clutch throw-out bearing against the flange by snap fit. The carrier member has a peripheral groove, preferably in the form of a pair of parallel flanges disposed at the other end of the carrier member, the opposite ends of the pins of a clutch control fork being engageable in the groove for abutment against a longitudinal wall in the groove and for snap fit between that longitudinal wall and at least one deflectable projection on an inner wall of the groove.

6 Claims, 1 Drawing Sheet

CLUTCH RELEASE BEARING AND BEARING CARRIER ASSEMBLY

BACKGROUND OF THE INVENTION

The present invention relates to a clutch release bearing in general and more particularly to a clutch release bearing and bearing carrier assembly having a snap fit coupling with an associated clutch fork lever.

Mechanical disk clutches as used, for example, in motor vehicles for controllably coupling the motor vehicle internal combustion engine flywheel to the gear box input shaft, are normally biased to engagement by spring means, such as for example a diaphragm spring provided with fingers engaged at their end with the non-revolving race of a release bearing, or throw-out bearing, such as a ball bearing, the non-revolving race of the bearing being supported by a tubular sleeve or carrier. The sleeve or carrier is in turn slidably mounted over a tubular member concentrically disposed around the driveshaft.

As long as the clutch is engaged, the revolving race of the throw-out bearing is constantly engaged with the end of the clutch release fingers by a relatively weak spring bias and the throw-out bearing and bearing carrier assembly is axially displaced by appropriate control means in the direction that displaces the clutch release finger to release the clutch. The axial displacement of the throw-out bearing and bearing carrier assembly is effected, for example, by a mechanical actuator such as a clutch control fork lever, operated by the clutch pedal or by a hydraulic actuator. The clutch control fork lever has a bifurcated end which is disposed straddling the clutch throw-out bearing carrier and attached in some manner to the carrier such as to controllably displace the carrier longitudinally in the appropriate direction disengaging the clutch, while preventing the carrier and the non-revolving race of the bearing supported by the carrier from rotating.

SUMMARY OF THE INVENTION

The present invention has for its principal object to provide a clutch release bearing and bearing carrier providing a simple snap fit between the carrier and the clutch release fork lever, and a simple snap fit or mounting of the bearing on a bearing support flange of the carrier.

These and other objects of the invention will become apparent to those skilled in the art when the following description of the best mode contemplated at the present for practicing the invention is read in conjunction with the accompanying drawing wherein like reference numerals refer to like or equivalent parts and in which:

DETAILED DESCRIPTION OF THE PREFERRED EMBODIMENT

Figure 1:
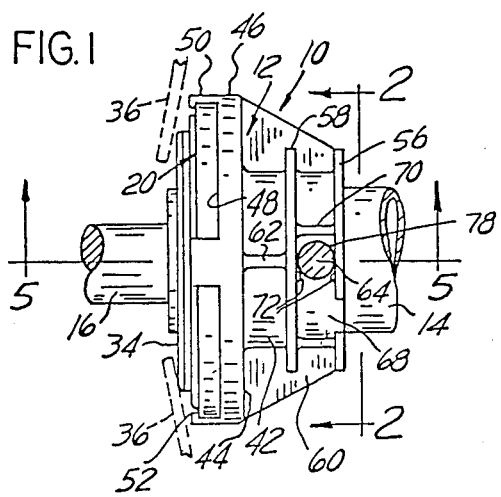
FIG. 1 is a side elevational view of a clutch release bearing and bearing carrier assembly according to the present invention, installed over, and concentric to, a driveshaft.

The embodiment of clutch release bearing and bearing carrier assembly 10 of the invention illustrated in the drawing comprises a bearing carrier 12, made preferably of a single piece plastic molding, disposed concentric to and slidably over a stationary tubular member 14, integral with or attached to, for example, and end plate of a motor vehicle gear box, not shown, the gear box input shaft 16 being disposed coaxially within the tubular member 14. The carrier 12 has a central bore 18 slidably engaged with the peripheral surface of the tubular member 14. Preferably, the material of which the carrier 12 is molded is a polyamide resin, or nylon, glass-reinforced, and comprising a small quantity of molybdenum disulfide, to provide dry lubricant characteristics to its surface.

Figure 3:
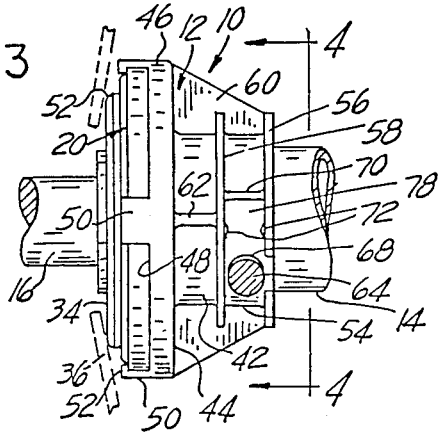
FIG. 3 is a view similar to FIG. 1, but showing the clutch release bearing and bearing carrier assembly of the invention in the process of being coupled to a clutch release fork.
Figure 5:
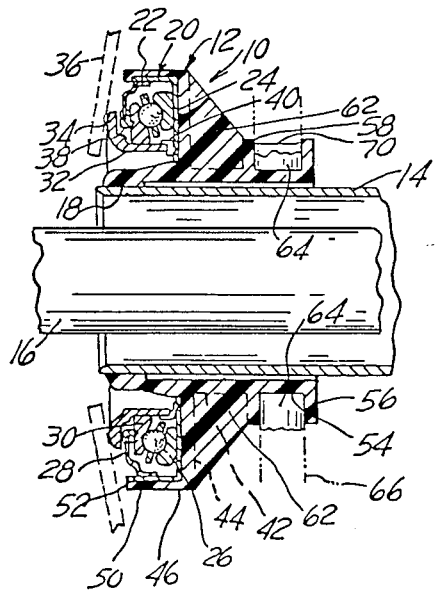
FIG. 5 is a longitudinal section thereof along line 5—5 of FIG. 1.

The carrier 12 supports on one end a clutch release or throw-out bearing 20, FIGS. 1, 3 and 5, the bearing 20 taking preferably the form of a ball bearing enclosed in a metallic housing filled with lubricant and sealed from the ambient. The housing of the bearing 20 comprises a relatively thin sheet metal cylindrical peripheral portion or wall 22, as best shown at FIG. 5, having an integral substantially wide annular rear flat portion or wall 24 slidably supporting on its interior surface one annular race 26 of the bearing 20. The bearing housing also comprises a generally annular frontal portion or wall 28 extended part of the way over the other annular race 30 of the bearing, a short distance away from the race 30. A generally L-shaped annular member 32 is fastened to the bearing race 30, such as by welding or brazing, and has, in use, an exteriorly rounded, spaced apart, flange portion or spacer 34 constantly engaged with the end of the clutch release spring fingers 36. The edge of the bearing housing frontal wall 28, which extend in the space between the bearing race 30 and the rounded flange 34 of the annular member 32, is provided with an annular elastomeric seal 38 and, preferably, an annular elastomeric seal 40 closes the gap between the free end of the annular member 32 and the bearing housing rear wall 24.

The bearing carrier 12 has a tubular main body portion 42, provided with the bore 18, having an integral radially and outwardly extending flange 44 terminating in a concentric cylindrical integral rim or collar 46. As best shown at FIGS. 1 and 3, the collar 46 is provided with a plurality of cut-out portions 48 forming therebetween a plurality of lugs 50, four in number in the example of structure illustrated. Each lug 50 has an inwardly directed stepped abutment shoulder portion 52. The bearing 20 is installed on the carrier 12 by being pressed against the flange 44 within the collar 46. The rear wall 24 of the bearing housing or enclosure is dimensioned such as to fit against the surface of the annular flange 44, within the collar 46, with the peripheral cylindrical portion 22 of the bearing housing 22 disposed in engagement with the inner surface of the collar 46 and of the lugs 50 and being retained within the collar 46 by the inwardly directed abutment shoulder portion 52 at the end of each lug. It is readily apparent that during installation of the bearing 20 within the collar 46 of the carrier 12, the lugs 50 are springingly spread outwardly in view of the engagement of the tip of the lug abutment shoulder portions 52 with the ball bearing housing peripheral wall 22. The lugs 50 spring back to their original position, after the bearing 20 has been fully inserted, such as to retain the bearing 20 securely within the collar 46 against the surface of the annular flange 44, the lug abutment shoulder portions 52 preventing the bearing 20 from escaping from its support.

In the arrangement illustrated, the bearing race 30 is capable of rotation relative to the bearing race 26 and, during normal operation of the motor vehicle, is caused to rotate as a result of being driven by the clutch diaphragm spring fingers 36 through the intermediary of the L-shaped annular member 32. The carrier 12 is prevented from rotating as a result of being coupled, as explained hereinafter, to the clutch control release mechanism. The bearing race 26 is non-rotating and is slidably supported on the inner surface of the bearing housing rear wall 24, being simply applied against that surface by the biasing effect of the clutch spring fingers 36 while the clutch, not shown, is engaged, and with the additional pressure caused by displacement of the carrier 12 towards the left of the drawing, during release of the clutch.

The end of the carrier 12 opposite to the end supporting the bearing 20 has a peripheral groove 54 defined between a radially extending end flange 56 and an intermediary flange 58. At least two substantially triangular ribs 60 extend from the bearing supporting flange 44 all the way to the end flange 56, and at least a pair of similarly substantially triangular ribs 62 extend from the bearing supporting flange 44 to the intermediary flange 58. The ribs 60 and 62 have no other function or purpose than improving the overall strength and rigidity of the carrier 12.

Figure 2:
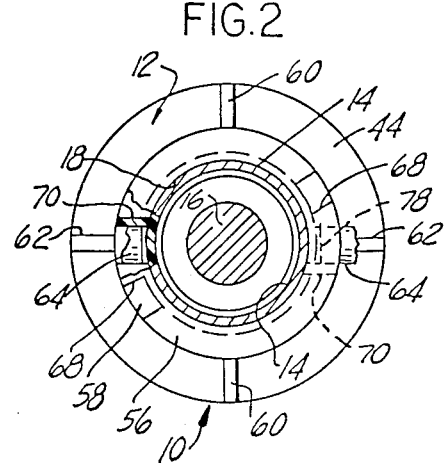
FIG. 2 is an end view thereof from line 2—2 of FIG. 1, with portions broken away to show the internal construction.
Figure 4:
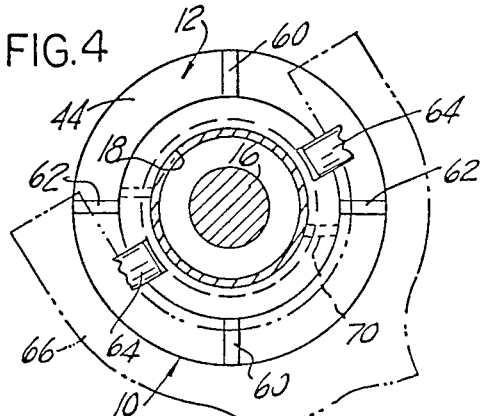
FIG. 4 is a view thereof from line 4—4 of FIG. 3.

The groove 54, formed between the flanges 56 and 58, is dimensioned such as to accept the end of a pair of diametrally opposed pins 64 mounted within the bifurcated end of the clutch release fork lever, shown only at FIG. 4 schematically and in phantom line at 66. The clutch release fork lever 66 is attached to the carroer 12 by passing the fork pins 64 through slots 68 through the wall of the end flange 56, as illustrated more particularly at FIGS. 3 and 4, and by rotating the carrier 12 and the clutch fork release lever 66 relative to each other, around the longitudinal axis of the carrier 12 until a lateral portion of the peripheral surface of each pin 64 engages with an abutment wall 70, molded integrally and extending between the end flange 56 and the intermediary flange 58 across the groove 54. Each abutment wall 70, during operation of the motor vehicle, is constantly urged against the side of each pin 64, thus preventing rotation of the carrier 12 under the small drag between the revolving race 30 of the bearing 20 and the non-revolving race 26. As is readily apparent to those skilled in the art, the clutch fork 66 controls the operation of the clutch by oscillation of the clutch fork 66 around a pivot point, causing in turn displacement of the pins 64 along a slightly curvilinear course, and displacing the carrier 12 longitudinally along the support tubular member 14. Each pin 64, during assembly of the clutch fork 66 to the carrier 12, and in the course of its displacement from the slots 68 through the wall of the end flange 56 within the groove 54, is caused to pass beyond a pair of opposite detent ridges or projections 72, as shown in a somewhat exaggerated manner at FIG. 6, formed integrally with the flanges 56 and 58 and projecting a short distance toward each other within the groove 54. Each of the ridges or projections 72 has a sloping leading side which gradually forces the portion of the end flange 56 between the slot 68 and the abutment wall 70 to elastically bend and spread away from the intermediary flange 58, to enable each pin 64 to snap past the projections 72 and be captured within the groove 54 in the space 78 between the abutment wall 70, the rear surface 76 of the ridges or projections 72 and the lateral walls of the groove 54 formed by the end flange 56 and the intermediary flange 58. In view of the relative elasticity of the plastic material of which the carrier 12 is molded, after the pins 64 are disposed in the space 78 within the groove 54 as shown at FIGS. 1–2 and 6, the portion of the end flange 56 between the abutment wall 70 and the notch or slot 68 springs back to its original position holding the clutch control fork lever 66 attached to the carrier 12 securely enough such that, if so desired, the clutch control fork lever 66 may be preassembled to the carrier 12 until the carrier is installed over the support tube 14, and the clutch control fork lever 66 installed in the vehicle and connected to the clutch pedal.

Figure 6:
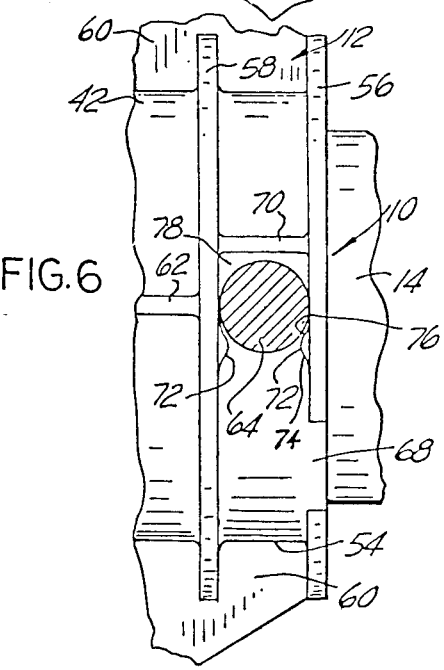
FIG. 6 is a view of a portion of the structure illustrated at FIG. 1 shown at an enlarged scale.

As shown more clearly at FIG. 6, a certain amount of play is provided for each pin 64 within the space 78 in the groove 54 between the projections 72 and the abutment wall 70 such as to accommodate slight amounts of misalignment, manufactuer tolerances, and non-linear motions of the fork pins 64. The reinforcing ribs 62 of the carrier 12 join with the intermediary flange 58 substantially in alignment with the force applied by the clutch fork pins 64 upon the intermediary flange 58 during release of the clutch, such that force is transmitted to the bearing supporting flange 44 in compression principally through the ribs 62.

In order to accommodate axis misalignment, the bearing 20 is radially self-aligning, as a result of the non-revolving race 26 of the bearing being frictionally engaged with the inner surface of the bearing housing end wall 24, such as to permit limited radial displacement of the bearing 20 within the bearing housing.

Having thus described the present invention by way of an example of structure well designed to accomplish the objects of the invention, modification whereof will be apparent to those skilled in the art, what is claimed as new is as follows:

I claim:

1. A clutch release bearing and bearing carrier assembly comprising a single piece carrier member in the form of a tubular body slidably disposable over a tubular support member, an integral radial flange at an end of said tubular body, said radial flange having an integral edge rim, cut-out portions in said rim forming a plurality of longitudinally projecting retaining resilient lugs between said cut-out portions each having an inwardly radially directed retaining shoulder, and a bearing member at least partially enclosed in a generally annular housing, said housing having a cylindrical wall engaged with said flange, whereby said bearing member is retained within said rim by snap fit behind the retaining shoulder of each of said lubs, and means coupling said carrier member to a clutch control member comprising a peripheral groove at the other end of said tubular body, a projecting member of said clutch control member engaged in said groove for displacement of said tubular body longitudinally along said tubular support member, wherein said groove is defined between a pair of substantially parallel radial flanges and said member projecting from said clutch control member comprises a pin radially engaged between said radial flanges, and further comprising snap fit means for holding said pin in a predetermined position between said radial flanges defining said groove, a longitudinal abutment wall disposed between said radial flanges defining said groove, at least one ridge projecting from one of said radial flanges defining said groove for locally reducing the width of said groove to less than the diameter of said pin, at least one of said radial flanges defining said groove being elastically deflectable for allowing said pin to be displaced through said groove to an operative position whereby said pin is peripherally engaged with said longitudinal abutment wall.

2. The assembly of claim 1 wherein one of said radial flanges defining said groove has a cut-out portion for insertion of said pin to said actuating position by displacing said clutch control member and said tubular body longitudinally relative to each other, and by rotating said tubular body and said clutch control member relative to each other for engaging said pin laterally with said longitudinal abutment wall between said radial flanges past said ridge locally reducing the width of said groove.

3. A clutch release bearing and bearing carrier assembly comprising a single piece carrier member in the form of a tubular body slidably disposable over a tubular support member, an integral radial flange at an end of said tubular body, said radial flange having an integral edge rim, cut-out portions in said rim forming a plurality of longitudinally projecting retaining resilient lugs between said cut-out portions each having an inwardly radially directed retaining shoulder, a bearing member at least partially enclosed in a generally annular housing, said housing having a cylindrical wall engaged in said rim below said lugs and an annular wall engaged with said flange, whereby said bearing member is retained within said rim by snap fit behind the retaining shoulder of each of said lugs, said bearing member having a non-revolving race in frictional engagement with said housing annular wall and a revolving race, said revolving race being adapted for engagement with clutch release elements, and means on said tubular body coupling said tubular body to a clutch control member, said means coupling said tubular body to a clutch control member comprising a peripheral groove at the other end of said tubular body and a pin projecting from said clutch control member engaged in said groove for displacement of said tubular body longitudinally along said tubular support member, a longitudinal abutment wall disposed in said groove, and a ridge projecting from at least one sidewall of said groove for locally reducing the width of said groove to less than the diameter of said pin, wherein at least one sidewall of said groove is elastically deflectable for allowing said pin to be displaced through said groove to an operative position whereby said pin is peripherally engaged with said longitudinal abutment wall.

4. The assembly of claim 3 wherein said groove is defined between a pair of substantially parallel radial flanges, and one of said radial flanges defining said groove has a cut-out portion for insertion of said pin to said actuating position by displacing said pin and said tubular body longitudinally relative to each other, and by rotating said tubular body and said pin relative to each other for engaging said pin laterally with said longitudinal abutment wall between said radial flanges past said ridge locally reducing the width of said groove.

5. A clutch release bearing and bearing carrier assembly comprising a single piece carrier member in the form of a tubular body slidably disposable over a tubular support member, means supporting a bearing member at an end of said tubular body, and means coupling said carrier member to a clutch control member, said coupling means comprising a peripheral groove at the other end of said tubular body and a projecting member of said clutch control member engaged in said groove for displacement of said carrier member longitudinally along said tubular support member, wherein said groove is defined between a pair of substantially parallel radial flanges and said member projecting from said clutch control member comprises a pin radially engaged between said radial flanges defining said groove, a longitudinal abutment wall disposed between said radial flanges defining said groove, at least one ridge projecting from one of said radial flanges defining said groove, for locally reducing the width of said groove to less than the diameter of said pin, at least one of said radial flanges defining said groove being elastically deflected for allowing said pin to be displaced through said groove to an operative position whereby said pin is peripherally engaged with said longitudinal abutment wall, wherein one of said flanges defining said groove has a cut-out portion for insertion of said pin to said actuating position by displacing said pin and said carrier member longitudinally relative to each other and by rotating said carrier member and said pin relative to each other for engaging said pin peripherally with said longitudinal wall between said flanges past said reduced width portion of said groove.

6. The assembly of claim 5 wherein said means supporting a bearing member at an end of said tubular body comprises an integral radial flange at said end of said tubular body, said radial flange having an integral edge rim, cut-out portions in said rim forming a plurality of longitudinally projecting retaining resilient lugs between said cut-out portions each having an inwardly radially directed retaining shoulder, said bearing member being at least partially enclosed in a generally annular housing, said housing having a cylindrical wall for engagement with said flange at said one end of said tubular body, whereby said bearing member is retained within said rim by snap fit behind the retaining shoulder of each of said lugs.

* * * * *